United States Patent
Verschuren

(10) Patent No.: US 7,675,823 B2
(45) Date of Patent: Mar. 9, 2010

(54) INITIAL FOCUS OPTIMIZATION FOR AN OPTICAL SCANNING DEVICE

(75) Inventor: Coen Adrianus Verschuren, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 494 days.

(21) Appl. No.: 11/572,602

(22) PCT Filed: Jul. 20, 2005

(86) PCT No.: PCT/IB2005/052430
§ 371 (c)(1), (2), (4) Date: Jan. 24, 2007

(87) PCT Pub. No.: WO2006/013509
PCT Pub. Date: Feb. 9, 2006

(65) Prior Publication Data
US 2008/0304374 A1      Dec. 11, 2008

(30) Foreign Application Priority Data
Jul. 27, 2004 (EP) .................................. 04103590
Apr. 29, 2005 (EP) .................................. 05103575

(51) Int. Cl.
*G11B 7/00* (2006.01)

(52) U.S. Cl. .............. 369/44.23; 369/44.32; 369/44.25; 369/112.23; 369/112.01

(58) Field of Classification Search .................. None
See application file for complete search history.

(56) References Cited

U.S. PATENT DOCUMENTS 6,404,710 B1    6/2002    Ichimura et al.

(Continued)

FOREIGN PATENT DOCUMENTS

| EP | 1030294 A2 | 8/2000 |
| EP | 1041545 A1 | 10/2000 |
| EP | 1437719 A2 | 7/2004 |

OTHER PUBLICATIONS

T. Ishimoto, et al.: Gap Servo System for a Biaxial Device Using an Optical Gap Signal in a Near Field Readout System, Technical Digest ISOM/ODS. Jpn. J. Applied Physics vol. 42, Part 1, No. 5A, May 2003, pp. 2719-2724.

(Continued)

*Primary Examiner*—Muhammad N. Edun

(57) ABSTRACT

In a particular type of high-density optical recording systems, a solid immersion lens (SIL) is used in the objective system to focus a radiation beam onto an information layer of an optical record carrier. The distance between the exit surface of the SIL and the entrance surface of the record carrier is typically 25 nm to allow evanescent coupling of the radiation from the SIL to the optical record carrier for a system using a blue laser as radiation source. Such a system is also called a near-field system, deriving its name from the near field formed by the evanescent wave at the exit face of the SIL. A suitable gap signal, representing the width of the gap, is used to control the width of the gap during operation of the system. Tolerances in the optical elements and opto-mechanical components of the optical system of the optical recording system can lead to an offset in the position of the focus point of the objective system. The offset can be larger than the typically used gap width for such a recording system. This can lead to direct contact between the SIL and the record carrier, which may result in damaging one or both of them. The invention discloses a method and implementation for a focus initialization correcting the focus offset of the optical system used to read out or record the optical record carrier such that a reliable and robust gap signal can be derived for gap width control.

12 Claims, 3 Drawing Sheets

U.S. PATENT DOCUMENTS

| | | |
|---|---|---|
| 6,496,468 B2 | 12/2002 | Hajjar et al. |
| 6,717,896 B1 | 4/2004 | Imanishi et al. |
| 2001/0050896 A1 | 12/2001 | Hajjar et al. |
| 2003/0184832 A1 | 10/2003 | Imanishi et al. |
| 2006/0187773 A1* | 8/2006 | Ishimoto .................. 369/44.25 |

OTHER PUBLICATIONS

F. Zijp, et al.: Near Field Read-out of a 50 GB First-Surface Disk with NA==1.9 and a Proposal for a Cover-layer Incident, Dual-layer Near Field System, Proceedings of SPIE, Optical Data Storage Conf. 2004, vol. 5380, pp. 209-223.

Y. V Martinov, et al.: High-Density First-Surface Magneto-Optical Recording Using a Blue Laser, High Numerical Aperture Objective and Flying Slider, ODS Proceedings of SPIE, Val. 4342, 2002, pp. 209-212.

Written Opinion of the International Searching Authority PCT-IB2005/052430.

* cited by examiner

Tolerances resulting in 15 mλ RMS OPD

|  | N-LaSF35 |  |
| --- | --- | --- |
|  | NA=1.80 |  |
| λ | 405 | nm |
| Field* | 0.55 | ° |
| Lens-SIL dist. | 0.25 | μm |
| Lens-SIL dist.* | 20 | μm |
| SIL off-axis | >20 | μm |
| SIL thickness | 0.30 | μm |

* Optimized collimator position for defocus correction in drive.

INITIAL FOCUS OPTIMIZATION FOR AN OPTICAL SCANNING DEVICE

FIELD OF THE INVENTION

The present invention relates to an optical scanning device for scanning record carriers, in particular for scanning record carriers using evanescent coupling of radiation.

BACKGROUND OF THE INVENTION

In a particular type of high-density optical scanning device, a solid immersion lens (SIL) is used to focus a radiation beam to a scanning spot on an information layer of a record carrier. A certain size of an air gap between the exit face of the SIL and the entrance face of the record carrier, for example 25 nm, is desirable to allow evanescent coupling of the radiation beam from the SIL to the record carrier. Evanescent coupling may otherwise be referred to as frustrated total internal reflection (FTIR). Recording systems using evanescent coupling are also known as near-field systems, deriving their name from the field formed by the evanescent wave at an exit face of the SIL, which is sometimes referred to as the near field. An exemplary optical scanning device may use a radiation source which is a blue laser emitting a radiation beam having a wavelength of approximately 405 nm.

During scanning of the record carrier the evanescent coupling between the exit face of the SIL and the outer face of the record carrier should be maintained. This involves maintaining the size of the gap at a desired, very small value during motion between the SIL and the record carrier. An efficiency of this evanescent coupling in general varies with a change in the size of the gap between the exit face and the entrance face. When the gap size becomes larger than a desired gap size the coupling efficiency tends to decrease and a quality of the scanning spot will also decrease. If the scanning procedure involves reading data from the record carrier, for example, this decrease in efficiency will result in a decrease in the quality of the data being read, possibly with the introduction of errors into the data signal. Too small a gap size may result in collision of the SIL and the record carrier.

To allow control of the width of the air gap using a mechanical actuator at such small distances, a suitable control signal is required as input for the gap servo system. The gap signal is a signal that is a measure for the width of the gap between the exit surface of the objective system and the entrance surface of the optical record carrier. As disclosed in the paper by T. Ishimoto et al. [1] and Zijp et al. [2], a signal that is suitable as gap signal can be obtained from the reflected light with a polarization state perpendicular to that of the forward radiation beam that is focused on the record carrier. A significant fraction of the light becomes elliptically polarized after reflection at the SIL-air-record carrier interfaces: this effect creates the well-known Maltese cross when the reflected light is observed through crossed polarizers. Integrating all the light of this Maltese cross using polarizing optics and a radiation detector, which can be a single photodetector, generates the gap signal. The value of gap signal is zero for zero gap width and increases with increasing gap width and levels of at a maximum value when the gap width is approximately a tenth of the wavelength. The desired gap width corresponds to a certain value of the gap signal, the set-point. The gap signal and a fixed voltage equal to the set-point are input in a comparator, e.g. a subtractor, which forms a gap error signal at its output. The gap error signal is used to control the gap servo system.

Due to manufacturing tolerances of lens elements and assembly (such as thickness, mutual distance and radii of the optical elements) of the objective lens, it is very difficult to make a near field lens with its focus point at the desired position. As the gap width is preferably in the range of about 25 nm the requirements on the focus position of the system are in a similar range. The depth of focus is about $\lambda/2NA_{eff}^2$ (were the focused spot is just diffraction-limited), which results for a wavelength of 405 nm and a $NA_{eff}$ of 1.8 in about 63 nm.

The tolerance on the Lens-SIL distance for less than 15 mλ rms (milli-waves root-mean-square optical path difference (RMS OPD)) wavefront aberrations is only 0.25 μm (see paper by F. Zijp et al. [2]), which is extremely difficult to achieve in practice. Deviations of the vergence of the radiation beam from the design values for the beam vergence of the objective lens in use, may also affect the resulting position of the focus in the system. Besides this defocus also other aberrations, such as spherical aberration, can affect the position of the focus of the system.

All such errors may result in an erroneous gap signal. As the distance from the exit surface of the SIL to the record carrier is typically smaller than 1/10th of the wavelength of the radiation, there will be a risk of damaging the optical record carrier with the objective lens when the gap signal is not correct.

A current practice for the focus initialization of the optical recording system is based on a very tight tolerance on the vergence of the radiation beam, preferably a parallel radiation beam, towards the objective lens. Then the objective lens is mounted in the optical path. The objective lens is brought into contact with a non-rotating record carrier (e.g. a ROM disc) while focus and tracking servo control are not active (open loop). As the non-rotating record carrier is usually making small excursions, e.g. due to vibrations of the setup, modulations will be present in the signals of the tracking or RF-detection channel of the system. The focus offset of the system is then adjusted by means of vergence change of the radiation beam towards the objective lens (e.g. by means of telescope or collimator position adjustment) such that the gap signal is substantially zero when a readout signal (such as for example push-pull or data) with sufficient modulation are obtained. Now a gap signal corrected for focus offset is available and a startup of the system with a rotating disc using gap control and tracking control can be done (see [2]).

This offset adjustment can be obtained by changing the incoming laser beam from parallel to slightly convergent or divergent, for example by adjusting the collimator lens position or the position of a lens in a telescope configuration. For example, defocus aberrations due to a Lens-SIL distance error up to 20 μm were possible to be compensated in that way in the available optical recording system.

Larger errors may also be possible to correct in the same way; however, the resulting aberration level (mainly due to spherical aberrations) in the focused radiation beam will increase.

This means that it may be needed to optimize the collimator or telescope lens position for each manufactured objective lens. A possible alternative is to keep the collimator or telescope positions fixed such that the radiation beam towards the objective lens is a highly defined parallel radiation beam, and the Lens-SIL distance is adjusted by an additional actuator to minimize the defocus. This approach may, however, increase the complexity, cost and the moving mass of the lens system, which will reduce the bandwidth and therefore the achievable data rate. Especially when the near field optical recording system is to be commercialized and low-cost, compact and mass-producible optical pickup units (OPUs) are to be applied.

Another possible involves an interferometric measurement in the OPU. This is however a time-consuming measurement and is expected also to be difficult to perform because a lens with a NA larger than unity needs to be analyzed in a reflection set-up inside a compact build OPU.

Methods for initial focus optimization based on, for example, maximizing the central aperture or RF (data) signal during read-out of the record carrier may not be usable as an initial step as this already requires an initial focus setting as well as disc angle adjustments. A non-optimal focus position may lead to a highly aberrated spot, such that the gap control and/or tracking may easily fail. This can even leading to a crash between the objective lens with the record carrier when reading out the record carrier, which may lead to a damaged or unusable record carrier or objective lens.

The present focus initialization methods are therefore considered to be not robust and time consuming.

The main object of the invention is to provide a method an implementation for a robust initialization of the focus position in a near field or evanescent coupling optical recording system such that a reliable gap signal can be obtained.

SUMMARY OF THE INVENTION

According to a first aspect of the invention, there is provided claim an optical scanning device for scanning an optical record carrier (82) at a scanning position, the record carrier having an entrance surface (120) and at least one information layer, the device comprising: a radiation source (60) for generating a forward radiation beam (62); an objective system for focusing the radiation beam onto the at least one information layer; the objective system having an exit surface (122) being arranged in the path of the forward radiation beam between the radiation source and the scanning position and providing for evanescent coupling of the radiation with the optical record carrier across a gap between the exit surface and the entrance surface when the optical record carrier is located in the scanning position; a radiation detector (108) for detecting a reflected radiation beam coming from the objective system and providing a gap signal representing the width of the gap; characterized in that the device comprises means (72) for adjusting the vergence of the forward radiation beam for correcting a focus offset in the device in dependence of the gap signal.

Hence, the application of the invention introduces the possibility to initialize the focus offset of the system in order to avoid a possible crash of the objective lens system with the record carrier by making use of available optical components in the prior art. By eliminating the focus offsets in the optical recording system a reliable gap signal can be obtained.

In a preferred embodiment of the invention the means for adjusting is located in the objective system, which may render a compact optical system. In preferred embodiments of the invention the means for adjusting the vergence of the forward beam comprises an axially movable optical element or alternatively an optical element having an electrically adjustable variable focus length.

According to a second aspect of the invention, there is provided a method for correcting the focus offset in an optical scanning device including at least the steps of: increasing the gap width between the entrance surface of the optical record carrier and the exit surface of the objective system to at least $1/10^{th}$ of the wavelength of the forward radiation if the gap width is smaller than said $1/10^{th}$ of the wavelength; focusing a forward radiation beam onto the exit surface of the objective system; adjusting the vergence of the radiation beam towards the exit surface of the objective system in dependence of the gap signal.

According to a third aspect of the invention, there is provided a method for correcting the focus offset in an optical scanning device as above, including the step of correcting the vergence of the radiation beam towards the exit surface of the objective system for the thickness of the material between entrance surface and the information layer closest to the entrance surface of the optical record carrier.

DETAILED DESCRIPTION OF THE INVENTION

The maximum information density that can be recorded on an optical record carrier in an optical recording system scales inversely with the size of the laser spot that is focused on a scanning position on the information layer. The spot size is determined by the ratio of two optical parameters: the wavelength $\lambda$ of the radiation beam forming the spot and the numerical aperture (NA) of the objective lens focusing the radiation beam. The NA of an objective lens is defined as $NA=n\sin(\theta)$, where n is the refractive index of the medium in which the light is focused and $\theta$ is the half angle of the focused cone of light in that medium. It is evident that the upper limit for the NA of an objective lens that focuses in air or via air in a plane parallel plate (like a flat disk) is in general unity.

Figure 1A:
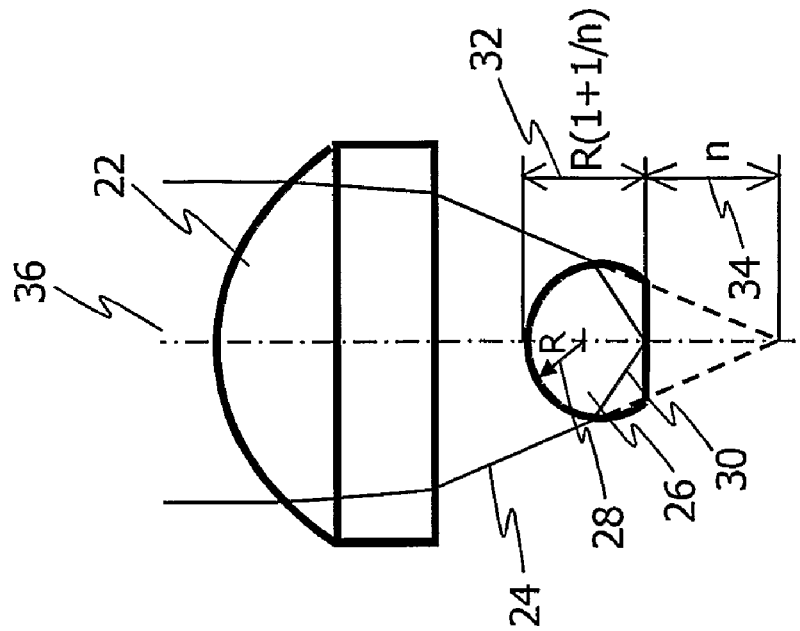
FIG. 1a shows a lens focusing a light beam in air in accordance with the prior art.
Figure 1B:
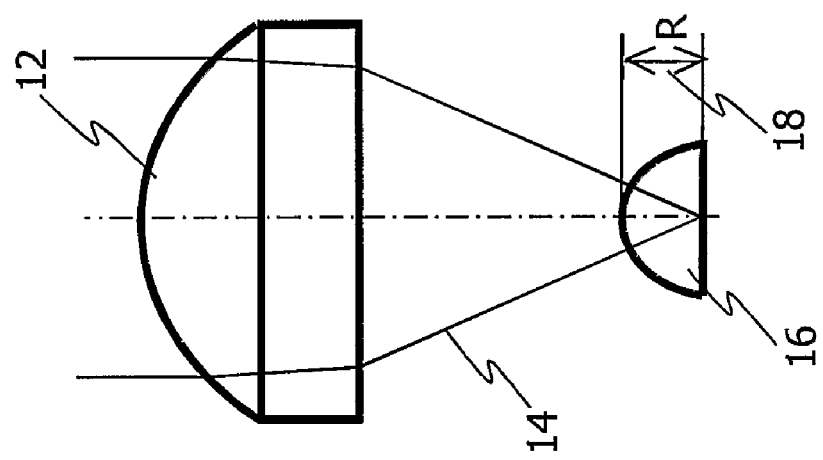
FIG. 1b shows a lens focusing a light beam in a hemispherical solid immersion lens in accordance with the prior art.

FIG. 1a shows an example of a lens 2 focusing a light beam 4 in air, where the half angle of the focused cone of light is $\theta$, shown as item 8, and the optical axis is shown as a dashed-dotted line 6. The NA of a lens can exceed unity if the light is focused in a high index medium without refraction at the air-medium interface, for example by focusing in the center of a hemispherical SIL. FIG. 1b shows an example of a lens 12 focusing a light beam 14 through such a hemispherical SIL 16 with a radius R, shown as arrow 18. In this case the effective NA is $NA_{eff}=n\, NA_0$ with n the refractive index of the hemispherical lens and $NA_0$ the NA in air of the focusing lens.

Figure 1C:
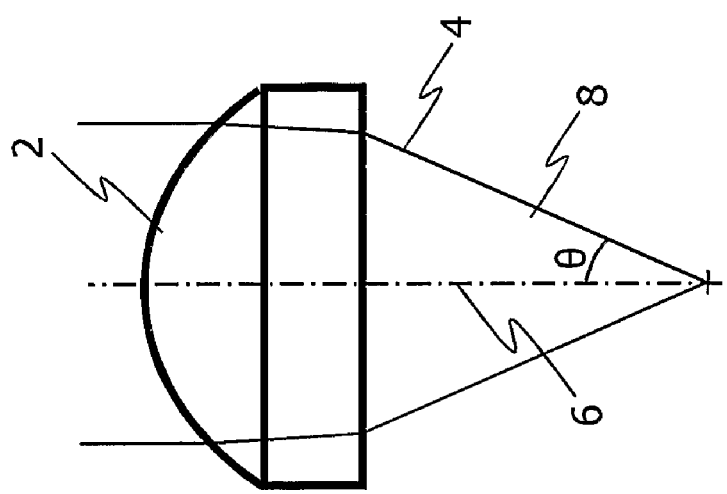
FIG. 1c shows a lens focusing a light beam in an aplanatic super-hemispherical solid immersion lens in accordance with the prior art.

A possibility to further increase the NA is by use of an aplanatic super-hemispherical SIL. FIG. 1c shows an example of a lens 22 focusing a light beam 24 through such an aplanatic super-hemispherical SIL 26 of radius R, indicated by arrow 28, in which the super-hemispherical SIL 26 refracts the beam 30 towards the optical axis 36 and focuses it below the center of the super-hemisphere. In this case the effective NA is $NA_{eff}=n^2\, NA_0$. For an aplanatic super-hemispherical SIL of height $R(1+1/n)$ along the optical axis, indicated by arrow 32, the beam can be focused at a distance nR, indicated by arrow 34, closer to lens 2 than the case in FIG. 1a with no SIL.

Importantly, an effective $NA_{eff}$ larger than unity is only present within an extremely short distance (also called the near-field) from the exit surface of the SIL, where an evanescent wave exists. The exit surface of the objective system is the last refractive surface of the objective system before the radiation impinges on the record carrier. The short distance is typically smaller than one tenth of the wavelength of the radiation.

When an entrance face of an optical record carrier is arranged within this short distance, radiation is transmitted from the SIL to the record carrier by evanescent coupling. This means that during writing or reading of an optical record carrier, the distance between the SIL and record carrier, or the gap width, should be smaller than a few tens of nanometers, for example about 25 nm for a system using a blue laser as radiation source and an NA of the objective system of 1.9. In a so-called air-incident optical record carrier, one side of the information layer is in contact with a substrate and the other side is exposed to the environment. The entrance face of such a record carrier is the interface between the information layer and the environment. Alternatively, the information layer is protected from the environment by a thin transparent layer, the outer surface of which forms the entrance face of the record carrier. In the latter case the thickness of the SIL must be corrected for the thickness of the transparent layer.

Figure 2:
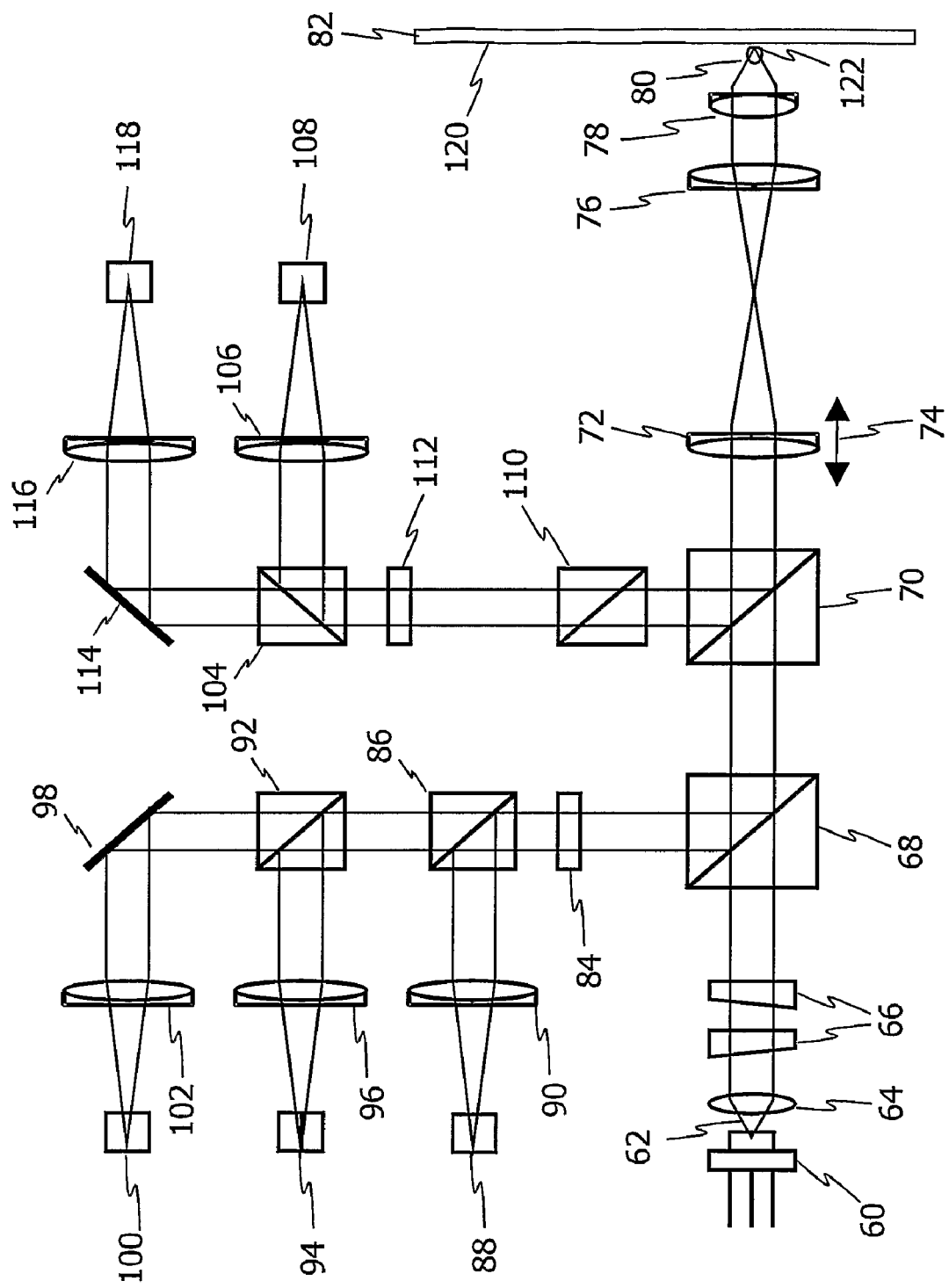
FIG. 2 shows schematically a near field optical scanning device in accordance with the prior art.

FIG. 2 shows schematically a near field optical scanning device for scanning a record carrier in accordance with the prior art. The optical scanning device comprises a radiation source system that is arranged to generate radiation. In this embodiment the radiation source is a laser 60 emitting a radiation beam 62 having a predetermined wavelength λ, for example approximately 405 nm. During both a start-up procedure and a record carrier scanning procedure of the optical scanning device, the radiation beam 62 passes along an optical axis (not indicated) of the optical scanning device and is collimated by a collimator lens 64 and its cross-sectional intensity distribution shaped by a beam shaper 66. The radiation beam 62 then passes through a non-polarizing beam splitter 68, followed by a polarizing beam splitter 70 and has a focus introduced between a first focus adjustment lens 72 and a second focus adjustment lens 76.

An optimal adjustment of a focus position of the radiation beam 62 on the record carrier is achieved by moving the first focus adjustment lens 72 in a focus adjustment direction 74. An objective system of the optical scanning device comprises an objective lens 78 that introduces a focusing wavefront into the radiation beam 62. The objective system further comprises a solid immersion lens (SIL) 80. In this embodiment the SIL 80 has a conical super-hemispherical shape as in FIG. 1c, which in this example has a NA of 1.9. The planar side of the SIL forms an exit face facing a record carrier 82.

A supporting frame (not shown) ensures that an alignment and a separation distance of the objective lens 78 with the SIL 80 are maintained. The supporting frame is kept at the correct distance from the record carrier by a gap servo system (not shown) that is described in more detail below. After the introduction of the focusing wavefront by the objective system, the radiation beam forms a radiation beam spot on the record carrier 82. The radiation beam that falls onto the record carrier 82 has a linear polarization.

The record carrier 82 has an entrance face 120 that faces the SIL 80 exit face 122. The objective system is arranged between the radiation source 60 and the record carrier 82 and a gap between the exit face 122 and the entrance face 120 has a gap size, which is the distance between the exit face 122 and the entrance face 120 along the optical axis.

The optical scanning device includes a plurality of optical detection paths. In a first optical detection path there is arranged a polarizer 110, a half-wave plate 112, a polarizing beam splitter 104, a folding mirror 114, a first condenser lens 106 for focusing a detection radiation beam onto a first detector 108 and a second condenser lens 116 for focusing a detection radiation beam onto a second detector 118.

The polarizer 110, half-wave plate 112, folding mirror 114, second condenser lens 116 and second detector 118 are optional components for experimental research purposes. The second detector could for example be a CCD type detector. Radiation passing through the polarizing beam splitter 104 is reflected by the folding mirror 114 and focused by the condensing lens 116 onto the second detector 118. If these optional components are not used, the polarizing beam splitter 104 could be replaced with a folding mirror in order to guide a portion of the detection radiation beam onto the first detector.

In a second, different, detection path there is arranged a half-wave plate 84, a polarizing beam splitter 86, a non-polarizing beam splitter 92, a third condenser lens 90 for focusing a detection radiation beam onto a third detector 88, a fourth condenser lens 96 for focusing a detection radiation beam onto a fourth detector 94, a folding mirror 98 and a fifth condenser lens 102 for focusing a detection radiation beam onto a fifth detector 100.

Similarly to the first detection path, the half-wave plate 84, folding mirror 98, fifth condenser lens 102 and fifth detector 100 are optional components for experimental research purposes. The fifth detector could be for example a CCD type detector. Radiation passing through the non-polarizing beam splitter 92 is reflected by the folding mirror 98 and focused by the condensing lens 102 onto the fifth detector 100. If these optional components are not used, the non-polarizing beam splitter 92 could be replaced with a folding mirror in order to guide a portion of the detection radiation beam onto the fourth detector.

The first, third and fourth detectors, shown by items 108, 88 and 94 respectively, constitute a radiation detector arrangement for generating detector signals representing information detected in the radiation after interaction with the record carrier 82.

The first detection path is used for detection of radiation reflected from the SIL 80 and polarized perpendicular to the forward radiation beam that is focused on the record carrier. The perpendicularly polarized radiation is referred to as the RF ⊥ pol. signal. The gap signal 152 is derived from the low-frequency part (e.g. DC to 30 kHz) of the RF ⊥ pol. signal. The second detection path is used for detection of radiation that is polarized parallel to the forward radiation beam that is focused on the record carrier and is modulated by the information read from the information layer. The portion of light in the second detection path that is detected by the third detector is referred to as the RF//pol. signal, the function of which is described in more detail later. The portion of light in the second detection path that is detected by the fourth detector is referred to as the push-pull signal and is used to generate a signal representing the transverse distance between the spot and the center of the data track of the record carrier 82 to be followed. The signal is used to maintain a radial tracking of the scanning radiation spot on the data track.

The radiation passing along the first detection path and the radiation passing along the second detection path are orthogonal polarized with respect to each other.

The method based on the use of the Gap Signal GS obtained via the reflection on the exit surface of the SIL without presence of a record carrier close to the exit surface of the SIL.

The invention is based on the observation that a Gap Signal also exists for a situation where there is no optical record carrier close to the exit surface of the SIL. For gap widths larger than required for evanescent wave coupling (e.g. for widths larger than 1/10th of the wavelength used), the light rays incident on the exit surface of the SIL that have incident angles above the critical angle will encounter total internal reflection on that exit surface. Because of a difference in reflectance of // and ⊥ polarized light rays at the exit surface of the SIL a Gap Signal can be obtained when focusing the radiation beam incident on the objective lens on to the exit surface of the SIL. This GS obtained via the reflection on the exit surface of the SIL may also be referred to as the Focus Initialization Signal (FIS). The same optics and detection means as used for the generation of the GS may be used to obtain the FIS.

It is observed that the FIS shows a maximum for the optimum focus position for the objective lens from which this FIS is derived. For a perfectly assembled objective lens, a parallel beam yields an optimum spot quality, and also a maximum in the FIS. In a similar fashion, an objective lens, which has a non-ideal distance between its two components (low NA lens and SIL), will yield an optimum spot quality if the irradiating beam is tuned to the right amount of convergence or divergence. Under the same conditions, the FIS will also show a maximum value.

For the present invention, a modification to the prior art device set-up of FIG. 2 is the addition of a means for adjusting the vergence of the forward radiation beam for correcting a focus offset in the optical scanning device in dependence of the gap signal.

Such a means can be an axially displacing lens for adjusting the vergence of the forward radiation beam towards the exit surface for correcting a focus offset in the device, and the means is arranged for correcting the focus offset by optimizing the gap signal with the gap width larger than required for evanescent coupling of the radiation between the exit surface of the objective system and the entrance surface of the optical record carrier.

Figure 3:
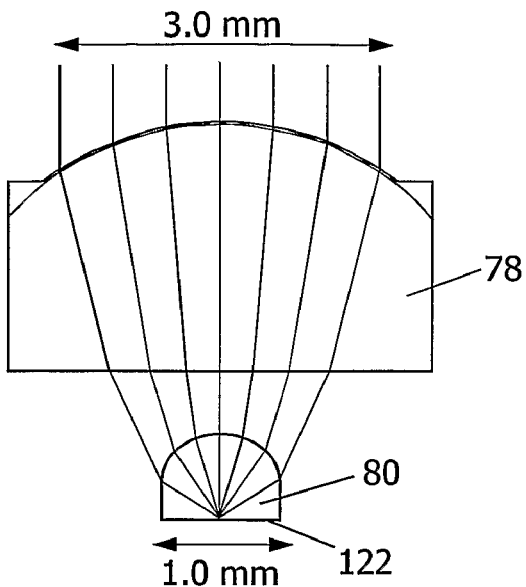
FIG. 3 shows some opto-mechanical parameters of a lens as used in the prior art.

For an objective lens (such as described in FIG. 3) usable in an optical device for a first surface (or air incident) optical recording system this corresponds to a focus position on the bottom (exit face) of the SIL. For an objective lens in an optical device for a cover-layer incident optical recording system, the optimum spot quality corresponds to a focus position directly below the cover-layer (typically a few micron in thickness).

Figure 4:
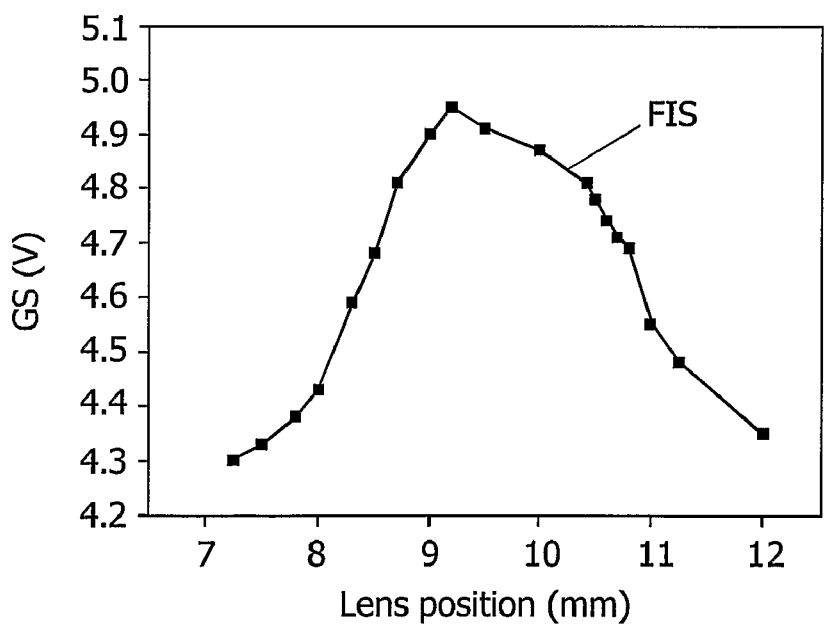
FIG. 4 shows schematically an example of a focus initialization signal according to the invention.

For a NA=1.8 objective lens designed for a first surface optical recording system, the above is confirmed with the following experiment using a setup as shown in FIG. 2. The lens that had been tuned with respect to thickness of the SIL by means of FIB (see [2]) showed a defocus of 29 m$\lambda$ rms and a spherical aberration of about 1 m$\lambda$ rms in interferometric measurements. FIG. 4 shows the FIS as a function of the position of one of the lenses in the telescope (see FIG. 2), which changes the convergence/divergence of the irradiating beam and therefore the position of the focused optical spot. Although the vertical axis of the graph in FIG. 4 refers to "G(V)" the FIS is shown in the graph. This indicates that the same electronics may be used for obtaining both the GS and the FIS.

The measurement of the FIS is done in the absence of a disc. As can be seen in FIG. 4 a maximum in the FIS is here obtained at a position of about 9.2 mm for the lens in the telescope (the zero position is here arbitrarily chosen). This lens position was chosen to start the read process with a newly inserted disc. After proper alignment of the disc in the setup with respect to for example tilt, the disc was read out. The open-loop gap control and tracking signals were found to be usable and of good quality. During read-out with gap servo and tracking servo operational (so, closed-loop servo), it was confirmed that the optimum data signal (based on, for example, best signal quality, largest peak-to-peak amplitude or lowest jitter) was obtained at practically the same telescope lens position of 9.2 mm (within an accuracy of 0.1 mm). This confirms that the focus initialization using the described method using the FIS resulted in a sufficient correction of the focal position of the lens used and in robust and reliable GS for gap width control.

For a second objective lens, which was known to have a larger amount of defocus (about 170 m$\lambda$ rms defocus and about 46 m$\lambda$ rms spherical aberration), the optimum telescope lens position was found to be about 10.0 mm, again for both the FIS method and for optimum data signal. Due to the focus offset correction the lens was still usable in the optical recording setup and also a safe gap signal could be obtained.

The above examples show the benefit of the proposed solution in practice. The proposed method of focus initialization can be an important step in the start-up process of such a high NA optical recording system to obtain a reliable air gap and tracking control signal. In the above experiments it was also shown that the accuracy of the focus initialization could be sufficient for an optimum read-out signal without a fine-tuning of the focusing during the read process.

The optimization of the FIS for focus offset correction can be done in various ways. It is, for example, possible to measure the FIS for several positions of the lens in the telescope (or equivalent parameters for other vergence varying means) and use the maximum value found. It is also possible to perform curve-fitting methods and use analytical methods to determine the maximum of the FIS and the related position (or equivalent parameter) of the vergence varying means. Using such a curve-fitting method it is possible to reduce for example measurement noise, leading to a more accurate value for the maximum. Another possibility is to apply a wobble on the lens position (or equivalent parameter for another vergence varying means) around the optimal position and use the resulting signal for optimization.

The better the maximum of the GS (or FIS) is determined the better will be the correction of the focus offset in the system. It is preferred to determine the maximum of the GS (or FIS) within a range of +/−5%. It is more preferred to determine the maximum of the GS (or FIS) within a range of +/−1% as this may lead to a situation in which the defocus is below the level where for example the gap servo system as described by Zijp et al. [2] can become active.

When required a further optimization of the focus position for optimal read-out or recording performance can be done during (initial) read-out of the record carrier, for example by maximizing central aperture amplitude (peak-to-peak), minimizing jitter, bit or block error rate or some other quality measure.

The focus initialization procedure may be used at each startup of the optical storage system to correct for focus offset effects. This can be done with the optical record carrier provided the initial gap width is larger than required for evanescent wave coupling (e.g. for gap widths larger than 1/10$^{th}$ of the wavelength used); this includes the situation of a system without an optical record carrier or during loading of the optical record carrier.

It may thus be needed to increase the gap between SIL exit surface and carrier to do the focus initialization (e.g. using the gap width actuator, optical record carrier ref. table (such as disc motor), tilting the frame containing the optical scanning device (or OPU) while loading the optical record carrier (such as used in cartridge loaded optical recording systems), or similar effective measures).

A method for correcting the focus offset in an optical scanning device as described above using the gap signal (or FIS) will at least include the following steps:

If necessary, increasing the gap width between the entrance surface of the optical record carrier and the exit surface of the objective system to at least 1/10th of the wavelength of the forward radiation if the gap width is smaller than said 1/10th of the wavelength A forward radiation beam is focused onto the exit surface of the objective system The vergence of the radiation beam towards the exit surface of the objective system is adjusted in dependence of the gap signal Due to for example mechanical variations (such as positional shifts) in the objective lens assembly or of the other optical elements in the optical scanning device used, the focal position can divert from the optimum position. Such mechanical variation may be caused by temperature variations, humidity variations, etc. during the recording or readout of a record carrier, but also during the technical lifetime of the optical recording apparatus. The proposed method and procedures can be used to correct the effects on the position of the focus.

The focus initialization procedure can be used when there is no disc in the optical recording apparatus or device or when the disc is at a distance outside the range for evanescent wave coupling (for gap widths larger than $1/10^{th}$ of the wavelength used). When required, other focusing methods using for example central aperture signal or modulation amplitudes, can be used to improve readout or recording quality.

Although in the above experiments and examples the FIS is generated by making use of a position shift of a lens in a telescope (see also FIG. 2), also other optical elements can be used to change the vergence of the radiation beam towards the objective lens. Such elements can be, for example, lenses based on liquid crystal optical elements or other optical elements with a variable focal length (e.g. electrically adjustable lenses based on a variable meniscus curvature between two fluids (electrowetting lens)). The vergence change can be based on refraction or diffraction of the radiation beam. When using an anamorphic lens type beamshaper between the radiation source and the collimator lens, this collimator lens can be shifted axially to obtain the required change of vergence of the radiation beam. Although it might become complex with respect to the required actuator it is also still possible to adjust the mutual lens-SIL distance in the objective lens.

It is also possible to include a spherical aberration compensation in the initial focusing method to compensate the defocus in the system generated by the spherical aberration.

In an optical recording system using an optical record carrier with a cover layer (see F. Zijp et al. [2] and Martinov et al. [3]) and/or multiple information or recording layers the same focusing initialization method can be applied. However, the optimum focus position is not at the bottom (exit face) of the SIL of the objective lens. A correction in the focus offset for the thickness of the cover layer is preferably required before using the gap signal as gap control signal. The spherical aberration induced by the cover layer may also be taken into account in that correction.

As an alternative a transparent dummy substrate (preferably corresponding to the cover layer thickness to be corrected) is put in front of the objective lens (preferably in contact with the SIL) before the FIS is used for compensating the focus offset in the gap signal. The radiation beam can then be focused on the backside of the dummy substrate. The required focus offset can be calculated using the optical characteristics of the objective lens and the correcting optical element that is changing the vergence of the radiation beam towards the objective lens.

The evanescent wave coupling for a system using an optical record carrier with a cover layer is not in the actual near field, but there is an evanescent coupling of waves from the exit surface of the SIL and the cover layer located between the SIL and the information layer (or layers) in the optical record carrier.

Although a coating is not referred to as a cover layer, it is also possible to correct for the thickness of a thin single or multiple layer coating used as, for example, corrosion protective or wear protective layer.

A similar method as described above for the focus-offset correction can be used for multi-layer optical recording carriers as for the cover layer incident optical recording carriers. The focus offset to introduce is then also depending on the depth of the location of information layer used for readout or recording optical recording system. When the spacer layer distance between the information layers is larger than the required gap width for evanescent wave coupling, it may be preferred to correct the focus offset additionally for the thickness of the material between entrance surface and the information layer closest to the entrance surface of the optical record carrier. This correction may be a fixed value based on the optical design of the objective lens and the means for changing the vergence of the radiation beam. The additional step in the method is therefore the correction of the vergence of the radiation beam for the thickness of the material between entrance surface and the information layer closest to the entrance surface of the optical record carrier.

As the number of layers in an optical record carrier is usually unknown before this information is readout from the optical record carrier itself, such correction with respect to the depth of the first information layer (closest to the entrance surface) is required to prevent contact of the objective lens with the optical record carrier.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

REFERENCES

[1] T. Ishimoto et al., "Gap Servo System for a Biaxial Device Using an Optical Gap Signal in a Near Field Readout System", Technical Digest ISOM/ODS 2002, pp. 287

[2] F. Zijp et al., "Near field read-out of a 50 GB first-surface disk with NA=1.9 and a proposal for a cover-layer incident, dual-layer near field system", Proceedings of the Optical Data Storage Conference 2004, Monterey (USA).

[3] Y. V. Martinov et al., "High-density first-surface magneto-optical recording using a blue laser, high numerical aperture objective and flying slider", ODS 2001, Proceedings of SPIE Vol. 4342, pp 209-212 (2002).

The invention claimed is:

1. An optical scanning device for scanning an optical record carrier (82) at a scanning position, the record carrier having an entrance surface (120) and at least one information layer, the device comprising:
   a radiation source (60) for generating a forward radiation beam (62),
   an objective system for focusing the radiation beam onto the at least one information layer, the objective system having an exit surface (122) being arranged in the part of the forward radiation beam between the radiation source and the scanning position and providing for evanescent coupling of the radiation with the optical record carrier across a gap between the exit surface and the entrance surface when the optical record carrier is located in the scanning position,
   a radiation detector (108) for detecting a reflected radiation beam coming from the objective system, said reflected radiation beam being a low frequency of and perpendicular polarized to said forward radiation beam, and providing a gap signal representing the width of the gap, characterized in that, the device comprise means (72) for adjusting the vergence of the forward radiation beam for correcting a focus offset in the device in dependence on the gap signal.

2. An optical scanning device of claim 1, wherein the means is located in the objective system.

3. An optical scanning device of claim 1, wherein the means comprises an axially movable optical element.

4. An optical scanning device of claim 1, wherein the means comprises an optical element having an electrically adjustable variable focal length.

5. An optical scanning device according claim 1 for scanning an optical record carrier with a cover layer having a thickness, wherein the correction of the focus offset is additionally corrected for the thickness of the material of the cover layer.

6. An optical scanning device according claim 1 for scanning an optical record carrier with multiple information layers, wherein the correction of the focus offset is additionally corrected for the thickness of the material between entrance surface and the information layer closest to the entrance surface of the optical record carrier.

7. An optical recording apparatus, comprising an optical scanning device according to claim 1.

8. A method for correcting the focus offset in an optical scanning device including at least the steps of:
   increasing the gap width between the entrance surface of the optical record carrier and the exit surface of the objective system to at least $1/10^{th}$ of the wavelength of the forward radiation if the gap width is smaller than said $1/10^{th}$ of the wavelength,
   focusing a forward radiation beam onto the exit surface of the objective system,
      adjusting the vergence of the radiation beam towards the exit surface of the objective system in dependence of the gap signal based on a reflected beam that represents a low frequency of and perpendicular polarized to said forward radiation beam.

9. A method for correcting the focus offset in an optical scanning device of claim 8, further including the step of correcting the vergence of the radiation beam towards the exit surface of the objective system for the thickness of the material between entrance surface and the information layer closest to the entrance surface of the optical record carrier.

10. A method for correcting the focus offset in an optical scanning device as in claim 8, the vergence of the radiation beam being adjusted such that the gap signal reaches a maximum values.

11. A method according to claim 10, in which the maximum value for the gap signal is determined using a wobble on the vergence of the radiation beam.

12. A method according to claim 8, further comprising the step of compensating the spherical aberration present in the optical scanning device.

\* \* \* \* \*